Patented Aug. 15, 1944

2,356,025

UNITED STATES PATENT OFFICE 2,356,025

ETHYL CELLULOSE EMULSIONS

Charles E. Bergamini, Bloomfield, N. J., assignor to Hercules Powder Company, Wilmington, Del., a corporation of Delaware No Drawing. Application November 8, 1941, Serial No. 418,333

9 Claims. (Cl. 106—170)

This invention relates to aqueous emulsions of lacquers containing ethyl cellulose and to methods for preparing the same; more particulrarly, it relates to aqueous emulsions of lacquers containing ethyl cellulose which may be prepared spontaneously without resort to homogenization.

It has heretofore been possible to prepare aqueous ethyl cellulose emulsions containing, in addition to the ethyl cellulose, various resins and/or plasticizers. These emulsions are of particular utility in textile finishing and in the preparation of printing pastes for textiles. In the preparation of these emulsions, permanent emulsifiers, as for example, sodium oleate, sodium lauryl sulfate, sulfated castor oil, etc., have been employed. Homogenization of the ingredients is required in order to obtain emulsions of satisfactory stability. This is a time-consuming and expensive operation. Since homogenization is normally required of the manufacturer, he has the problem of the stability of these emulsions on storage to cope with. Furthermore, in the use of these emulsions (of the oil-in-water type) they can only be diluted to a limited extent with water and still retain their stability. The resulting films obtained upon the application of these emulsions to textiles, etc., are undesirably sensitive to moisture, and the emulsifiers have an unpredictable plasticizing effect on the films. The films deposited by these emulsions are subject to discoloration upon exposure to elevated temperatures.

Now, in accordance with this invention, it has been found that an aqueous emulsion having greatly improved properties over the prior art compositions, can be prepared by utilizing an ethyl cellulose lacquer containing hydrogenated rosin having a hydrogen saturation of at least about 60% on the rosin acid basis, preferaply between about 70% and about 100%, in conjunction with a volatile alkali which is capable of forming an unstable complex with the hydrogenated rosin which complex decomposes at a temperature above about 15° C. upon evaporation of the volatile constituents, thereby allowing the alkali to volatilize. In the process of preparing the emulsions, the volatile alkali may be added directly to the ethyl cellulose lacquer containing the hydrogenated rosin and the resulting lacquer phase vigorously agitated with water, or the volatile alkali may be added to the water and the resulting aqueous phase vigorously agitated with the ethyl cellulose lacquer containing hydrogenated rosin. In either case a spontaneous emulsion results which does not require homogenization to achieve stability.

In accordance with the invention, a lacquer will be prepared employing ethyl cellulose which has been sufficiently etherified to be insoluble in water and inorganic solvents, hydrogenated rosin of at least about 60% hydrogen saturation, plasticizers as desired, also solvents and diluents. The resulting lacquer will then be emusified with water to form an aqueous emulsion of the oil-in-water type in which the lacquer is the dispersed phase, by employing as the emulsifying agent a volatile alkali having the capacity of forming an unstable complex with the hydrogenated rosin. As such volatile alkali, there may be employed ammonium hydroxide or a volatile amine. An ethyl cellulose lacquer emulsion will result having good stability and great practical utility.

There follow several examples which are illustrative of the principles of the invention which, however, are not to be construed as being limiting. All parts and percentages are by weight unless otherwise specified. The ethyl cellulose employed had an ethoxy content of 47.5% and a viscosity of 90–105 centipoises in 5% concentration in a solution comprising 80 parts of toluol and 20 parts of ethyl alcohol.

EXAMPLE 1

An emulsion was prepared utilizing the following formulation:

Lacquer phase

| | Parts |
|---|---|
| Ethyl cellulose | 16 |
| Refined mineral oil | 4 |
| Hydrogenated rosin (80% saturated) | 9 |
| Solvesso No. 2 | 63 |
| Butanol | 8 |

Water phase

| | Parts |
|---|---|
| Ammonium hydroxide (28%) | 5 |
| Water | 95 |

An emulsion resulted spontaneously upon slowly stirring the water phase into the lacquer phase. The emulsion was characterized by excellent stability characteristics and had a particle size of substantially 100% below 10 microns in diameter. No homogenization was necessary. It could be diluted to the extent of 1 part of emulsion to 50 parts of water while still retaining its stability.

EXAMPLE 2

Several emulsions were prepared utilizing the following formulations:

| | A | B |
|---|---|---|
| | Parts | Parts |
| Ethyl cellulose | 16 | 16 |
| Hydrogenated rosin (80% saturation) | 8 | |
| Tetrahydro rosin acids | | 8 |
| Xylene | 58 | 58 |
| Hi-Flash naphtha | 10 | 10 |
| Butanol | 8 | 8 |

The tetrahydro rosin acids employed above were obtained from hydrogenated rosin of about 63% hydrogen saturation on the rosin acid basis by crystallization from petroleum ether. The above lacquers were spontaneously emulsified by stirring ammonium hydroxide into the lacquer phase and then adding water slowly while stirring with a power mixer. The particular formulations are given in the following tabulation:

| Emulsion No. | 1 | 2 | 3 | 4 |
|---|---|---|---|---|
| | Parts | Parts | Parts | Parts |
| Lacquer No. A | 40.0 | | 40.0 | |
| Lacquer No. B | | 40.0 | | 40.0 |
| Ammonium hydroxide | 0.8 | 0.8 | 1.2 | 1.2 |
| Water | 19.2 | 19.2 | 18.8 | 18.8 |

Stable emulsions resulted in each case, the particle size of the dispersed phase being substantially 100% below 10 microns in diameter. Each of the emulsions so prepared was diluted with 3 parts of water, and in diluted form they retained their stability. They were then used to impregnate 80 x 80 inch print cloth, and the cloth was squeezed and dried over heated rolls at 250° F. The volatile alkali was driven off, thereby depositing the ethyl cellulose-hydrogenated rosin film on the textile fibers. The resistance of these treated fabrics to discoloration at elevated temperatures, such as, those encountered in sanforizing, was tested by placing them on an iron at 450° F. for 30 seconds and weighing them down against the iron with a 232 gram weight, the area of the weight in contact with the cloth being 3.5 square inches. Under such conditions, the resistance of the fabrics to discoloration was shown to be excellent, they being noticeably more resistant than fabrics impregnated with similar ethyl cellulose emulsions containing the glycerol ester of rosin and potassium oleate as the emulsifier or emulsions containing the glycerol ester of hydrogenated rosin and potassium oleate as the emulsifier. Fabrics finished with the emulsions of this example also showed less discoloration upon prolonged exposure at a temperature of 105° F. than the standard emulsions containing the glycerol ester of rosin or the glycerol ester of hydrogenated rosin. In addition, fabrics finished with the emulsions of this example had good initial color and were not sensitive to moisture, whereas the standard fabrics had comparatively poor initial color and were sensitive to moisture.

Example 3

An emulsion was made employing the following formulation:

Lacquer phase

| | Parts |
|---|---|
| Ethyl cellulose | 16 |
| Tetrahydro rosin acids | 8 |
| Xylene | 58 |
| Hi-Flash naphtha | 10 |
| Butanol | 8 |

Water phase

| | Parts |
|---|---|
| Morpholine | 5 |
| Water | 95 |

The tetrahydro rosin acids employed were obtained from hydrogenated rosin of about 63% hydrogen saturation on the rosin acid basis by crystallization from petroleum ether. Upon admixing the two phases with agitation with a power mixer, a spontaneous emulsion was obtained, the dispersed phase having a particle size substantially 100% below 10 microns in diameter. No homogenization was required. The emulsion showed excellent stability characteristics and retained such characteristics upon dilution with water. The emulsion could be diluted to the extent of 1 part of emulsion to 50 parts of water without destroying its stability.

Although one particular type of ethyl cellulose has been employed in the preceding examples, the invention is not limited to its use, but any ethyl cellulose may be employed which is sufficiently etherified to be insoluble in water and inorganic solvents. It may have, for example an ethoxy content in the range of about 43% to about 51%, and preferably from about 44% to about 48%. The viscosity characteristics of the ethyl cellulose used will depend upon the properties desired in the ultimate composition.

Various types of hydrogenated rosin may be employed instead of those employed in the examples. In fact, any hydrogenated rosin having a hydrogen saturation of at least about 60% as the rosin acid basis, preferably between about 70% and about 100% may be employed. The most preferable material to employ is a hydrogenated rosin of about 80% hydrogen saturation. By hydrogen saturation on the "rosin acid basis," there is contemplated an expression of the percentage of the double bonds of the rosin acids contained in rosin which are saturated with hydrogen on the assumption:

(1) That the acidic portion of the rosin is made up entirely of rosin acids of the formula $C_{19}H_{29}COOH$ having two double bonds per molecule.

(2) That all of the hydrogen is taken up by the acidic portion.

It is realized that this assumption may not conform entirely with the facts and that it is entirely possible to obtain rosins which on this basis show over 100% hydrogen saturation. These rosins of over 100% hydrogen saturation may advantageously be employed in accordance with the processes herein set forth.

The invention is not limited to the use of hydrogenated rosins prepared by any particular process. Thus, those prepared utilizing base metal catalysts, as nickel, nickel-aluminum, nickel-silicon, etc., noble metal catalysts, as platinum, palladium, etc., also the copper-chromite, etc., catalysts may be employed. Equivalently, the hydrogenated rosin acids contained in rosin, as hydrogenated abietic, sapinic, pimaric, sylvic, sapietic, etc., acids may be employed. In particular, tetrahydro rosin acids prepared from hydrogenated rosin by various methods, as crystallization from petroleum ether, butane under pressure, etc., may be employed.

The lacquer employed in preparing the aqueous emulsions of this invention may contain a softening or plasticizing agent. If one is employed, it will desirably be one which is compatible with ethyl cellulose and the ethyl cellulose-hydrogenated rosin mixture. Suitable plasticizers are hydrogenated methyl abietate, hydrogenated ethyl abietate, triphenyl phosphate, tricresyl phosphate, tributyl phosphate, methyl phthalyl methyl glycollate, ethyl phthalyl ethyl glycollate, di-(para-tertiary butyl phenyl), mono-(5-tertiary butyl-2-xenyl) phosphate, etc. As solvents for the ethyl cellulose, hydrogenated rosin, and plasticizers if one is employed, any common solvent for the ingredients may be employed. Preferably, a mixed solvent comprising solvents such as, for example, light aromatic hydrocarbons; petroleum hydrocarbons as Stoddard solvent; butanol, pine oil, etc., will be employed. By Stoddard solvent there is meant the petroleum hydrocarbon solvent known in the industry by that name and generally having a distillation range of 152° C. to 195° C.

In the examples ammonium hydroxide or morpholine was employed to accomplish emulsification. However, any other volatile alkali which is capable of forming an unstable complex with the hydrogenated rosin of the character described which complex decomposes at a temperature above 15° C. upon evaporation of the volatile constituents of the emulsion, thereby allowing the alkali to volatilize, may be equivalently employed. Thus, in addition to ammonium hydroxide, primary, secondary and tertiary amines may be utilized, as for example, methylamine, ethylamine, propylamine, butylamine, morpholine, monoethanolamine, diethanolamine, triethanolamine, ethylene diamine, propylene diamine, dibutylamine, etc.

As illustrated in the foregoing examples, varying ratios of hydrogenated rosin to ethyl cellulose may be employed in the preparation of the lacquer phase. In general, up to 100% and preferably between about 30% and about 80% hydrogenated rosin on the basis of the ethyl cellulose will be employed. The maximum amount of hydrogenated rosin employed is, however, dependent upon the particular hydrogenated rosin employed. For example, with hydrogenated rosin of 60% hydrogen saturation on the rosin acid basis, up to 100% hydrogenated rosin may be employed based on the weight of ethyl cellulose. However, with hydrogenated rosin of 100% or more hydrogen saturation on the rosin acid basis or with tetrahydro rosin acids, up to 60% hydrogenated rosin may be employed based on the weight of the ethyl cellulose. Varying amounts of plasticizers may be included as desired, the amount, however, generally not exceeding 50% on the basis of the ethyl cellulose.

The lacquer phase prepared in accordance with this invention will be formulated so as to have a solids content most desirable for the particular use to which the final lacquer emulsion is to be put. In the preparation of lacquer emulsions for textile finishing, it has been found convenient to employ lacquers of between 25% and 30% solid content. Furthermore, the amount of water employed in preparing the lacquer emulsion will vary greatly depending upon the desired viscosity of the emulsion, etc. The amount of volatile alkali employed to accomplish emulsification will desirably be from one-half to twice the amount theoretically required to completely saponify the hydrogenated rosin employed, the preferred amount being the amount required for complete saponification.

The lacquer emulsions contemplated herein have particular utility in the field of textile finishing. They may be used, for example to finish textile materials such as organdy, lace, broadcloth, cotton, wool, rayon, etc. Their use is not limited to textile finishing, however, and they may be desirably employed as bases to which pigments, various dyestuffs, etc., may be added to make textile printing pastes.

The ethyl cellulose lacquer emulsions prepared in accordance with the processes hereinbefore set forth present many practical advantges, some of which have been illustrated in the examples. Due to the fact that they do not require homogenization and result spontaneously upon vigorous agitation of the lacquer phase with water, they may be marketed in the lacquer form, thus stability problems in storage and shipping are eliminated. This, of course, decreases the shipping costs greatly. Furthermore, these spontaneous lacquer emulsions have excellent stability. This stability is maintained upon their dilution with water. Furthermore, they may be diluted to a greater extent with water while still maintaining their stability than the lacquer emulsions utilizing the so-called permanent emulsifiers. Still greater economy results from the use of these lacquer emulsions due to the fact that their ingredients are less expensive than those required for most of the prior art emulsions.

Textiles finished with these improved lacquer emulsions have improved initial color as compared with textiles finished with prior art compositions. Furthermore, these finished fabrics develop much less discoloration in the Cluett-Peabody tests at temperatures of 450° F. Prolonged exposures of these fabrics in ovens at 105° C. gives much less discoloration when compared with fabrics finished with prior art compositions subjected to the same exposure. An additional highly important factor is the lack of sensitivity to moisture obtained in finishes prepared from the improved emulsions.

What I claim and desire to protect by Letters Patent is:

1. A lacquer emulsion of the oil-in-water type having a dispersed phase comprising essentially an ethyl cellulose lacquer, and a disperse phase comprising essentially water and the reaction product of hydrogenated rosin having a hydrogen saturation of at least about 60% on the rosin acid basis with a voltatile alkali.

2. A lacquer emulsion of the oil-in-water type having a dispersed phase comprising essentially an ethyl cellulose lacquer, and a disperse phase comprising essentially water and the reaction product of hydrogenated rosin having a hydrogen saturation between about 70% and 100% on the rosin acid basis with a volatile alkali.

3. A lacquer emulsion of the oil-in-water type having a dispersed phase comprising essentially an ethyl cellulose lacquer, and a disperse phase comprising essentially water and the reaction product of hydrogenated rosin having a hydrogen saturation between about 70% and 100% on the rosin acid basis with ammonium hydroxide.

4. A lacquer emulsion of the oil-in-water type having a dispersed phase comprising essentially an ethyl cellulose lacquer, and a disperse phase comprising essentially water and the reaction product of hydrogenated rosin having a hydrogen saturation between about 70% and 100% on the rosin acid basis with a volatile amine.

5. A lacquer emulsion of the oil-in-water type having a dispersed phase comprising essentially an ethyl cellulose lacquer, and a disperse phase comprising essentially water and the reaction product of hydrogenated rosin having a hydrogen saturation between about 70% and 100% on the rosin acid basis with a volatile secondary amine.

6. A lacquer emulsion of the oil-in-water type having a dispersed phase comprising essentially an ethyl cellulose lacquer, and a disperse phase comprising essentially water and the reaction product of hydrogenated rosin having a hydrogen saturation between about 70% and 100% on the rosin acid basis with a volatile primary amine.

7. A lacquer emulsion of the oil-in-water type having a dispersed phase comprising essentially an ethyl cellulose lacquer, and a disperse phase comprising essentially water and the reaction product of hydrogenated rosin having a hydrogen saturation between about 70% and 100% on the rosin acid basis with morpholine.

8. A lacquer emulsion of the oil-in-water type having a dispersed phase comprising essentially an ethyl cellulose lacquer, and a disperse phase comprising essentially water and the reaction product of hydrogenated rosin having a hydrogen saturation between about 70% and 100% on the rosin acid basis with ethylamine.

9. A lacquer emulsion of the oil-in-water type having a dispersed phase comprising essentially an ethyl cellulose lacquer, and a disperse phase comprising essentially water and the reaction product of hydrogenated rosin having a hydrogen saturation of about 80% on the rosin acid basis with a volatile alkali.

CHARLES E. BERGAMINI.